April 14, 1970   HENRI-PIERRE CHABRIER   3,506,035
DISTRIBUTOR DEVICE FOR FLUIDS
Filed Dec. 16, 1966
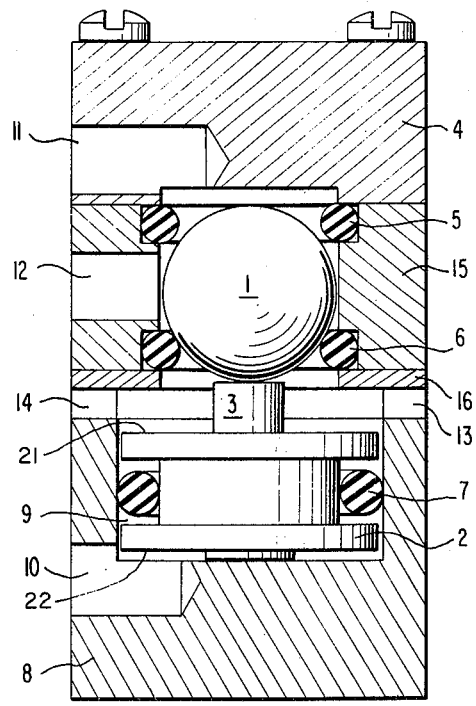
INVENTOR
HENRI-PIERRE CHABRIER
BY Paul M. Craig
ATTORNEY United States Patent Office 3,506,035
Patented Apr. 14, 1970

3,506,035
DISTRIBUTOR DEVICE FOR FLUIDS
Henri-Pierre Chabrier, Lyon, France, assignor to SETARAM Societe d'Etudes d'Automatisation de Regulation et d'Appareils de Mesures, Paris, France
Filed Dec. 16, 1966, Ser. No. 602,276
Int. Cl. F15c 3/06
U.S. Cl. 137—625.48        6 Claims

ABSTRACT OF THE DISCLOSURE

A distributor device for fluids, having two stable positions, and in which the control or actuating pressure acts on one face of a short-stroke piston displaceable in a bore. The bore is sealed off hermetically by a very lightly gripped toroidal flexible joint or seal situated in a wide groove in the piston and engaging the sides of the bore whereby it can be deformed by rolling to accommodate movement of the displaceable piston but without sliding.

---

This invention, which is due to the endeavours of Monsieur Henri-Pierre Chabrier, relates to a distributor device for fluids, having two stable positions, operating under the sole action of the resultant of the pressure forces and employed to establish logical control circuits.

The device comprises a first cavity endowed with four orifices and two seats. The orifices are connected, respectively, to a source of feed pressure, to a receiving device (outlet), to a source of reference pressure, and to a source of control or actuating pressure. The two seats are situated between the first and the second orifice in the case of the one, and between the second and the third orifice, in the case of the second. Communication between the first and second orifice, or between the second and third orifice is either opened or shut off alternately by means of a displaceable ball valve that is seated on either one or the other of the two seats depending on the actuating pressure.

The device of the invention pertains to the manner in which the control or actuating pressure acts on a movable piston that in turn controls the position of the displaceable ball valve. The piston is disposed in a cavity of the device situated between the third and fourth orifices, and is characterized by the fact that the said piston ensures sealing between these two orifices thanks to a toroidal flexible seal or joint positioned in a wide groove formed in the piston. The tightness of the joint in the groove and against the sidewall of the cavity is very slight and negligible, respectively, in such manner that the said joint preferably reacts to the displacement of the piston by an elastic transversal deformation and by rolling without slipping against the wall of the cavity without being thrust against the sides of the groove. In this manner a reliable, flexible and fluid tight seal is provided between the second and fourth orifices and assures against an undesirable bleeding off of the control or actuating signal pressure into the source of reference pressure. Amplification of the level of the control or actuating signal pressure is obtained by judicious dimensioning of the seats and displaceable elements relative to each other.

The groove in the displaceable piston has a width at least equal to 1.2 times the thickness of the toroidal joint. The true longitudinal displacement of the piston is very small, of the order of one millimeter, making allowance for the compression of the seats under the switching ball valve. The force required for switching is extremely small, which promotes positive and rapid switching action in the manner of a "shutter." The performance factors of the device are thus excellent, on the one hand owing to the short duration of the response period, and on the other hand owing to the small leak to the source of reference pressure in the transitional state during the switching action.

The single drawing figure illustrates a device constructed according to the invention in which the different portions of the cavity are shapes of revolution around a shared longitudinal axis, the outer shape being parallelepipedal. The device of FIGURE 1 comprises a hollow parallelepipedon body formed by assembling four components 4, 8, 15 and 16 joined together by means of screws situated close to the longitudinal edges of the parallelepipedon. The component 15 has a first cavity formed therein in which ball valve means comprised by a shutter ball valve 1 is displaceably disposed between the two seats 5 and 6 formed by two captive plastic toroidal joints or valve seats. It is of interest to employ the biggest ball valve possible in a given device, in order to increase the rate of through-flow and ensure optimum exploitation of material. A first orifice 11 is provided for connection to a source of feed pressure. A second orifice is formed in component 16 which coacts with the openings 13 and 14 to establish communication with a source of reference pressure (preferably atmosphere). A third orifice 12 is provided for connection to an output canalization.

The component 8 has a second cavity or cylindrical bore formed therein which communicates through the second orifice in component 16 with the first cavity. A movable piston 2 equipped with a pedestal 3 and with a groove 9 formed in a throat portion of the piston between a first upper surface 21 and a second lower surface 22 that define first upper and second lower chambers with the first upper chamber communicating through the openings 13 and 14 with the source of reference pressure. The first upper surface 21 of piston 2 is disposed in the second cavity is provided with a pedestal 3 extending through the second orifice to contact and control the position of the ball valve 1. The groove 9 has a width which is distinctly greater than that of the diameter of a toroidal joint or seal 7 which ensures sealing around the piston. When the piston is being displaced, the joint 7 rolls on itself and is deformed without being thrust against the sides of the groove. A fourth orifice 10 is provided in component 8 for establishing communication between the second lower chamber defined in the second cavity by the lower surface 21 of piston 2 and a source of control or actuating signal pressure.

This device operates in the following manner: In the absence of actuating signal pressure and under the action of the feed pressure, the ball valve 1 bears against the seat 6 and the outlet orifice 12 is pressurized. If an actuating signal pressure of sufficient magnitude is supplied from orifice 10, the piston 2 with its pedestal 3 is moved upward due to the pressure acting on the second lower surface 21 of piston 2 and propels the ball valve 1 onto the seat 5 and maintains it there for so long as the actuating pressure of sufficient magnitude is maintained in orifice 10. As a result, the infeed 11 is shut off, and the outlet 12 is connected to the source of reference pressure through 13 and 14. If the actuating pressure is removed from orifice 10, the supply pressure acting through orifice 11 returns ball valve 1 to its original position seated on seat 6.

It may occur however, as a result of production tolerances, of wear, or of a variation in temperature, for example, that the sealing joint 7 becomes solidly stuck to the piston or with the wall of the cavity, instead of rolling on both at the same time. This does not, however, affect the principle of the invention, and in all cases, the performance factors of the device according to the invention remains very superior in comparison to known devices of similar type which do not include the toroidal sealing joint. This is due to the fact that the sealing joint is very lightly gripped on its contact surfaces and is housed in a wide groove that accommodates the joint in its flexed or deformed condition.

It is of advantage for the devices according to the invention to comply simultaneously with the conditions set forth by the following formulae:

$$\left(\frac{D}{2R}\right)^2 = \frac{2P}{P+p} \pm 0.5$$

$$\beta \leq \alpha$$

$$e^2 \leq \frac{4brX}{R+r} \leq 2e^2$$

$$0.5 \leq \frac{a^2 - 4R^2}{s} \leq 2$$

in which:

D is the diameter of the portion of the second cavity in which the piston (2) is displaceable;

R is the radius of the shutter ball valve 1;

$a$ is the diameter of the portion of the first cavity in which the ball valve 1 is displaceable;

$b$ is the mean diameter of the toroidal seats 5 and 6;

$r$ is the radius of the section of the toroidal joints forming the seats 5 and 6;

$x$ is the displacement of the ball valve 1 delimited by the seats 5 and 6;

$\alpha$ is the angle of contact of the ball valve 1 with the seats 5 and 6;

$\beta$ is the angle of friction of the material forming the ball valve 1 with the material forming the seats 5 and 6;

$e$ is the diameter of the orifices of fluid infeed 11 and outflow 12;

$s$ is the total section of escape (or exhaust) towards the source of reference pressure;

P is the maximum pressure of the actuating signal pressure in bars;

$p$ is the minimum pressure of the actuating signal pressure in bars.

Devices according to the invention have been made with a square section of 20 mm. on a side and a length of 42 mm. and able to operate with contaminated industrial air with a feed pressure amounting to between 0.5 and 5 bars. The ball valve being in the low position, the rate of passage of the feed fluid exceeded 2,500 litres/hr. with a feed under 2 bars. In these conditions, it was possible to operate four devices according to the invention in series.

I claim:

1. A fluid logic distributor apparatus comprising a body defining a first cavity, a first orifice communicating with the first cavity for connection to a source of feed pressure, a second orifice communicating with the first cavity and oppositely disposed from the first orifice for connection to a source of reference pressure, a third orifice placed in the body between the first and second orifices and communicating with the first cavity for connection to an output canalization, ball valve means placed in the first cavity for selectively alternately closing and opening the first and second orifices, said body having walls defining a second cavity adjoining and communicating with the first cavity through the second orifice, a piston movably supported inside the second cavity and having first and second surfaces defining a first chamber and a second chamber in conjunction with the walls of the second cavity, the first chamber communicating with the second orifice and the source of reference pressure, a fourth orifice communicating with the lower chamber and connected to a source of control pressure, the said piston having a pedestal formed on the first surface thereof that defines the first chamber with the pedestal extending through the second orifice and acting on and selectively controlling the position of the ball valve means, said ball valve means serving to close the second orifice while opening the first orifice and vice versa, the improvement comprising a throat portion placed in the movable piston between the first and second surfaces thereof defining the first and second chambers, and fluid tight annular flexible joint means having a solid cross-section supported between the bottom of the throat portion and the surface of the second cavity, the flexible joint means and the throat portion being so proportional that piston movement produces a rolling transverse elastic deformation of the flexible joint means, and the rolling transverse elastic deformation of the flexible point means accommodates the movement of the piston devoid of any substantial increase in pressure on the throat portion and the surface of the second cavity and devoid of any relative sliding motion of the joint means with respect to the sides of the throat portion and the sides of the second cavity.

2. A fluid distributor apparatus according to claim 1, in which the piston and second cavity are cylindrically shaped and the throat portion of the piston comprises an annular U-shaped groove circumferentially surrounding the piston.

3. A fluid distributor apparatus according to claim 2, in which the said flexible joint is torroidally shaped and has a substantially circular cross section.

4. A fluid distributor apparatus according to claim 3, in which the width of the throat portion is greater than the distance between the extreme positions of the lateral fibers of the flexible joint for the deformation corressponding to the maximum travel of the piston.

5. A fluid distributor apparatus according to claim 4, in which the radial dimensions of the first and second surfaces of the piston on one side and on the other of the throat portion are less than the radial dimensions of the second cavity and the length of the piston is such that the maximum deviation angle of the axis of the piston in relation to the axis of the second cavity is less than the angle defining a possible blocking of the piston in the second cavity.

6. A fluid distributor apparatus according to claim 5, in which the total section $s$ for fluid outlet by the second orifice connecting the said first cavity to the said reference pressure source obeys the relationship $$0.5 \leq \frac{a^2 - 4R^2}{s} \leq 2$$

in which $a$ is the diameter of the portion of the cavity in which the ball valve is displaced, and R is the radius of the ball valve.

References Cited

UNITED STATES PATENTS

| | | | |
|---|---|---|---|
| 1,302,538 | 5/1919 | Gulick | 137—413 |
| 2,521,248 | 9/1950 | Parker | 277—177 |
| 2,738,803 | 3/1956 | Manning | 277—177 XR |
| 3,114,387 | 12/1963 | Barkan et al. | 251—63.4 XR |
| 3,291,153 | 12/1966 | Chabrier et al. | 137—625.66 XR |

FOREIGN PATENTS

| | | |
|---|---|---|
| 10,716 | 5/1899 | Great Britain. |
| 1,358,512 | 3/1964 | France. |
| 799,689 | 8/1958 | Great Britain. |

HENRY T. KLINKSIEK, Primary Examiner

U.S. Cl. X.R.

137—625.6